US012662181B1

(12) United States Patent
Santos

(10) Patent No.: US 12,662,181 B1
(45) Date of Patent: Jun. 23, 2026

(54) WHEELED CARRIER INCORPORATING SKI TRAVEL

(71) Applicant: David Santos, Ludlow, MA (US)

(72) Inventor: David Santos, Ludlow, MA (US)

(73) Assignee: David Santos, Ludlow, MA (US)

( * ) Notice: Subject to any disclaimer, the term of this patent is extended or adjusted under 35 U.S.C. 154(b) by 353 days.

(21) Appl. No.: 18/139,693

(22) Filed: Apr. 26, 2023

Related U.S. Application Data

(60) Provisional application No. 63/434,315, filed on Dec. 21, 2022.

(51) Int. Cl.
| | |
|---|---|
| *B62B 13/18* | (2006.01) |
| *B62B 3/00* | (2006.01) |
| *B62B 3/02* | (2006.01) |
| *B62B 13/06* | (2006.01) |

(52) U.S. Cl.
CPC .............. *B62B 13/18* (2013.01); *B62B 3/002* (2013.01); *B62B 3/02* (2013.01); *B62B 13/06* (2013.01); *B62B 2202/52* (2013.01)

(58) Field of Classification Search
CPC ......... B62B 13/18; B62B 13/06; B62B 3/002; B62B 3/02; B62B 9/04; B62B 19/00; B62B 19/04; B62B 2202/52; A63C 2005/063; A63C 17/018; A45C 11/20; F25D 3/06
See application file for complete search history.

(56) References Cited

U.S. PATENT DOCUMENTS

| | | | | |
|---|---|---|---|---|
| 527,357 | A | * | 10/1894 | Bongfeldt ............... B62B 13/18 280/11 |
| 1,275,521 | A | * | 8/1918 | Bowes .................... B62B 13/18 280/9 |
| 3,473,818 | A | | 10/1969 | Meredith |
| 3,765,696 | A | | 10/1973 | Capron |
| 4,251,085 | A | | 2/1981 | Lageer et al. |
| 5,222,748 | A | * | 6/1993 | Johnson .................. B62B 13/18 280/8 |
| 6,474,097 | B2 | | 11/2002 | Treppedi et al. |
| 7,364,170 | B2 | | 4/2008 | Aittama et al. |
| 8,181,811 | B1 | * | 5/2012 | Blake ..................... A45B 23/00 248/156 |
| 9,260,129 | B2 | | 2/2016 | Thompson |

(Continued)

FOREIGN PATENT DOCUMENTS

| | | | | |
|---|---|---|---|---|
| GB | 2527619 | A | * 12/2015 | ............. A45C 11/20 |

*Primary Examiner* — Steve Clemmons
(74) *Attorney, Agent, or Firm* — Womble Bond Dickinson (US) LLP

(57) ABSTRACT

An item carrier includes a cooler or other container configured to store at least one item. The item carrier further includes a set of wheels rotatably attached to the container, and a pair of skis comprising a left-side ski and a right-side ski. A ski support assembly secures the pair of skis to the container and is operable to selectively reposition the pair of skis with respect to the container. By operating the ski support assembly, the item carrier may switch between a first configuration, in which the left-side and right-side skis are positioned in respective stowed positions and do not provide ski-travel ability to the container, while the set of wheels provides rolling mobility to the container, and a second configuration, in which the left-side and right-side skis are positioned in respective deployed positions at which the pair of skis provides ski-travel mobility to the container.

19 Claims, 6 Drawing Sheets

(56) References Cited

U.S. PATENT DOCUMENTS

| | | | | | |
|---|---|---|---|---|---|
| 9,340,224 | B2 | | 5/2016 | Yoder et al. | |
| 9,481,388 | B2 | * | 11/2016 | Dondurur | .............. A45C 5/146 |
| 9,834,244 | B2 | * | 12/2017 | Hedberg | ................. B62B 13/18 |
| 10,953,907 | B2 | | 3/2021 | Wilkins | |

* cited by examiner

WHEELED CARRIER INCORPORATING SKI TRAVEL

CROSS-REFERENCE TO RELATED APPLICATION

This application claims the benefit of U.S. Provisional Patent Application No. 63/434,315, filed on Dec. 21, 2022, which is incorporated by reference herein in its entirety.

FIELD OF THE INVENTION

The present invention relates generally to non-motorized carriers, and more particularly, to a human-powered mobile carrier adapted for travel over hard and soft terrain using different modes of transportation.

BACKGROUND OF THE INVENTION

Visits to the seashore are a popular summertime activity in the United States, appealing especially to families who choose the oceanside for vacation. Unless vacationers stay in a beachfront property, however, it will be necessary to use a vehicle to reach the beach area. The typical beachgoer, for example, arrives in a vehicle and leaves the vehicle in a nearby parking lot close to the beach. The beachgoer then unloads items intended for the beach and transports them to an area near the shoreline where everything is set up for the day. A wide range of items may be desired or needed for the beach experience, including a beach umbrella, towels, clothes, sun protection, food, and other personal items (e.g., book, mobile phone, radio, headphones). A critical piece of equipment is the food storage container. Beaches are usually visited during the summer months to take advantage of the swim-friendly climate, marked by elevated air temperatures and intense sunshine. The typically hot climate makes it essential to provide some kind of food handling and to observe proper food management in order to prevent heat-induced food spoiling. The food storage container preferably serves to maintain and otherwise preserve certain food items at cooled temperatures, such as beverages and other perishable items (e.g., cheese, meat, and pre-cooked food). Some individuals also bring recreational equipment for certain activities, such as surfing and snorkeling. The required sports equipment for these activities includes articles such as swimming paraphernalia (e.g., snorkel, fins) and various types of surf boards. The transport of all of these items from a vehicle to the beach can be burdensome and cumbersome and only multiplies in difficulty if a group is involved, such as a family with children.

Individuals who live close enough to the ocean to walk to beach access and avoid vehicle usage face similar difficulties. In some respects these individuals encounter more problems since the travel distance to the beach on foot is likely much longer than what one would encounter embarking from a parking lot situated adjacent to the beach. The problems attending visits to the beach are not limited to trips to the ocean. Visitors to lakes experience similar problems trying to navigate from the lakefront to some set-up location near the water.

Various options are available to transport the items needed on an excursion to the water, whether the ocean, lake, bay, or other body of water where access to the water edge is not possible, feasible, or practicable except on foot. The individual can try to hand carry all of the items but this is an arduous if not impossible task considering the number and bulk of the items. The use of a large tote bag to store the articles does offer some help but this is only a partial solution since the tote bag, even one with a sizeable compartment, is only suited to hold several small- to medium-sized items and does not address the need to transport larger articles. Food is typically carried in a cooler, which comes in various sizes. A common type of cooler has a long rectangular body and is made of a plastic insulating material. The cooler has a large interior volume making it suitable to hold several items of varying size, including a multi-beverage container, packaged food, plastic containers holding food, and other miscellaneous food items A cooler typically comes with handles at both ends to accommodate a two-person carry. Even with the use of durable storage containers to consolidate everything, it can take several people to carry everything from the vehicle to the beach.

One convenient transport option employs a wheeled cart or wagon. The wagon would preferably include a deep interior defined by a high-walled perimeter, such as sturdy mesh or canvas sides reinforced by a framework of crossing brace pieces. The wagon could be collapsible to readily fit into the vehicle. The wagon would be equipped with a set of wheels and an elongated handle to pull the wagon. The wheels would typically be made of a hard, sturdy, solid plastic design to accommodate different terrains. The wheel width would be adequate to define a footprint or tread surface sufficient to provide the wheels with an all-terrain feature. In a customary application, the user would load the beach items into the oversized wagon, including a filled cooler if space allows. Depending on the type, wagons can be rated for several hundred pounds of weight-bearing capacity, which is more than adequate to carry what is needed for the beach. After packing the wagon, the user would then pull the loaded wagon from the parking area to the beach. The path of travel requires the wagon wheels to first navigate over a hard flat paved surface, an easy task for which the solid wheels are well suited. At the boundary of the parking lot, however, the wheeled wagon transitions abruptly to a completely different ground medium. The ground area of the beachfront is made of sand, a mass of fine-grained, granular, unconsolidated material. The sand is unpacked and displaces or yields easily in response to objects impacting the surface, such as when a person's feet sink into the sand with every step. The same concern applies to the wheels of a wagon, which do not negotiate the sand very readily. All of the weight of the wagon is borne by the wheels. It is very common for wagons to be stuck in the sand or at least sink deeply enough that the user eventually ends up dragging the wagon across the sand without any rolling assistance from the wheels, which find it difficult to maintain enough stable frictional traction to rotate and propel the wagon forward. This is the reason, for example, that standard protocol for off-road travel on the shoreline, even with 4-wheel drive vehicles (e.g., jeeps), requires the release of air pressure from the tires. The under-inflation of tires increases the tire width and thereby enhances the traction capability. However, this strategy is not available with the solid-wheel designs of hand-pulled carts and wagons Even if tire depressurization were an option, the incremental change in the wagon tire width would be too small to make a difference. Practically the only time when a wheeled wagon would travel adequately on the shoreline is when the sand is hard-packed, for instance, when it is wet from rain, a storm, or an advancing high tide. However, these conditions are too infrequent or unpredictable to be counted on, not to mention that beach visitation is also much less likely during these times.

Accordingly, there is need for a solution to at least one of the aforementioned problems. For instance, there is an established need for a mobile wagon or cart that can seamlessly transition between a hard terrain, such as a paved surface, and a soft terrain, such as a sandy beach.

SUMMARY OF THE INVENTION

The present invention is directed to a mobile, hand-drawn unit selectively adopting alternate modes of travel depending on the ground environment. The non-motorized unit includes a wheeled container and a pair of deployable skis carried by the container. The mobile unit is configured to alternately and selectively provide wheeled travel using a set of wheels mounted to the container, and provide a sliding-type, sled-like travel using the pair of skis. The skis, in one form, have an elongate main body, a curved front tip at a front end, and a curved rear tip at a rear end. The container includes front and rear ends, a pair of sides, a bottom, and a lid. The set of wheels is mounted to the container bottom. The container is equipped with a pivoting handle attached to the container to facilitate human-powered movement of the mobile unit. In alternate configurations of the mobile unit, the skis are either side-mounted or bottom-mounted to the container. The skis are movable between a stowed position and a deployed position. In the stowed position, the skis are retained or seated within respective, complementary-shaped recesses formed in the bottom or both sides of the container body. In the bottom-mounted configuration for stowing the skis, the ski-receiving recess extends longitudinally along the container bottom and features a vertically-extending front-tip-shaped recess section formed in the front end of the container and a vertically-extending rear-tip-shaped recess section formed in the rear end of the container. The bottom-located, longitudinally-extending, main recess portion transitions through front and rear bottom horizontal edges to seamlessly and continuously join the front-tip-shaped and rear-tip-shaped recess sections formed in the front and rear ends, respectively, of the container. In the side-mounted configuration for stowing the skis, the ski-receiving recess extends longitudinally along the side of the container and features a horizontally-extending front-tip-shaped recess section formed in the front end of the container and a horizontally-extending rear-tip-shaped recess section formed in the rear end of the container. The side-located, longitudinally-extending main recess section transitions through the same-side vertical edges at the front and rear ends to seamlessly and continuously join the front-tip-shaped and rear-tip-shaped recess sections formed in the front and rear ends, respectively, of the container. The ski-receiving recesses are suitably sized, shaped and dimensioned so that the stowed skis are flush with the container. In the deployed position, the skis are positioned below the container bottom and function as ski or sled runners to facilitate sliding travel of the mobile unit, replacing the wheels as the main contact surface with the ground. The wheel-based mobility is suited for travel on hard or semi-hard surfaces, such as roads, paved surfaces, and hard-packed dirt paths. The ski-based mobility is suited for travel on softer surfaces or ground material that easily yields, such as sand and snow. The bottom-stowed skis are adapted at their outer edge to include a pair of indents so that during deployment, as the skis are released from their stowed position at the bottom of the container and lowered to the ground surface, the pair of indents will capture, bracket and otherwise receive a respective one of the front and rear wheels at their corresponding side of the container, leaving part of the wheel to extend below the ski. In this deployment of the bottom-stowed skis, the skis are placed and otherwise situated at the inboard side of the wheels. The side-stowed skis are adapted at their inner edge to include a pair of indents so that during deployment, as the skis are released from their stowed position at the side of the container and lowered to the ground surface, the pair of indents will capture, bracket and otherwise receive a respective one of the front and rear wheels at their corresponding side of the container, leaving part of the wheel to extend below the ski. In this deployment of the side-stowed skis, the skis are placed and otherwise situated at the outboard side of the wheels. The partial extension of the wheels below the deployed skis allow the wheels to contribute to motion of the mobile unit by allowing the wheels to establish traction with the surface, if possible. For example, in some sandy locations, the ground might be sufficiently packed so that, while the skis maintain the primary contact with the surface, the wheels sink to a depth where some traction is possible to assist in the travel, combining the sledding-type movement afforded by the ski runners with the rolling action of the wheels, even if somewhat limited. A releasable latching mechanism is used to hold and retain the skis in their stowed position within the ski-receiving recesses. In one form, the latching mechanism includes a pivotable latch arm and a beveled catch at the remote working end of the latch arm. During ski stowage, the beveled catch is captured and otherwise seated within a latch-receiving notch formed at the underside of the front tip of the ski. Each ski is equipped with a set of collapsible or foldable support legs that support the skis during deployment. In one form, each support leg has a jointed, multi-link construction that locks together during full extension of the support leg to form a generally linear arrangement. Each support leg is movable between an extended, ski-supporting configuration and a collapsed, ski-stowing configuration.

In a first implementation of the invention, a combination comprises:

a chest container;

a set of wheels rotatably attached to the container;

a pair of deployable skis carried by the container;

a mechanism configured to deploy the pair of skis; and an actuator configured to selectively actuate the mechanism.

In a second aspect, the chest container includes a container body having a front end, a rear end, a right side, a left side, and a bottom. The chest container further includes a lid. The container body further includes a right front vertical edge, a left front vertical edge, a right rear vertical edge, and a left rear vertical edge. The container body further includes a bottom front horizontal edge and a bottom rear horizontal edge.

In another aspect, each wheel is configured for independent movement.

In another aspect, each ski is selectively movable between a stowed position and a deployed position.

In another aspect, each ski includes an elongate body, a curved front tip at one end of the elongate main ski body, and a curved rear tip at another end of the elongate main ski body.

In another aspect, the combination adopts a first configuration in which the skis are in stowage and the combination is capable of movement using the set of wheels. The combination adopts a second configuration in which the skis are deployed as runners to facilitate a sledding-type movement of the combination. The first configuration features solely wheeled movement. The second configuration features sliding movement and the availability of the wheels for wheeled movement.

In another aspect, the skis are deployed in an outboard relationship relative to the set of wheels.

In another aspect, the skis are deployed in an inboard relationship relative to the set of wheels.

In another aspect, the combination includes a pair of ski-receiving recesses formed in the container body. Each ski-receiving recess is suitably sized, shaped and dimensioned to receive, stow and retain at least part of a respective one of the skis.

In another aspect, during stowage, the skis sit flush in the ski-receiving recesses relative to surface features of the surrounding container body.

In another aspect, the pair of skis are carried at the bottom of the container.

In another aspect, the ski-receiving recesses facilitate stowage of the bottom-carried skis. Each ski-receiving recess includes an elongate recess section extending longitudinally in the bottom of the container and complementary to the elongate body of the ski, a rear-tip-shaped recess section contiguous with the elongate recess section and extending vertically in the rear end of the container and complementary to the rear tip of the ski, and a front-tip-shaped recess section contiguous with the elongate recess section and extending vertically in the front end of the container and complementary to the front tip of the ski.

In another aspect, the ski-receiving recess configured to seat the bottom-stowed skis includes a transition at the bottom front horizontal edge of the container body joining the elongate recess section and the front-tip-shaped recess section formed in the front end, and a transition at the bottom rear horizontal edge of the container body joining the elongate recess section and the rear-tip-shaped recess section formed in the rear end.

In another aspect, the bottom-stowed skis are deployed to occupy an inboard position relative to the set of wheels.

In another aspect, the bottom-stowed skis each include a pair of wheel-receiving indents formed at an outer edge of the ski and configured so that during inboard deployment of the skis, each wheel-receiving indent receives at least part of a respective wheel located outwardly of the ski. In another aspect, during ski deployment, the indent-seated wheels extend partly below a bottom of the ski.

In another aspect, the pair of skis are carried at the right and left sides of the container.

In another aspect, the ski-receiving recesses facilitate stowage of the side-carried skis. Each ski-receiving recess includes an elongate recess section extending longitudinally in a respective one of the right and left sides of the container and complementary to the elongate body of the ski, a rear-tip-shaped recess section contiguous with the elongate recess section and extending horizontally in the rear end of the container and complementary to the rear tip of the ski, and a front-tip-shaped recess section contiguous with the elongate recess section and extending horizontally in the front end of the container and complementary to the front tip of the ski.

In another aspect, each ski-receiving recess configured to seat a respective one of the side-stowed skis includes a transition at a respective one of the front vertical edges of the container body joining the elongate recess section and the front-tip-shaped recess section formed in the front end, and a transition at a respective one of the rear vertical edges of the container body joining the elongate recess section and the rear-tip-shaped recess section formed in the rear end.

In another aspect, the side-stowed skis are deployed to occupy an outboard position relative to the set of wheels.

In another aspect, the side-stowed skis each include a pair of wheel-receiving indents formed at an inner edge of the ski and configured so that during outboard deployment of the skis, each wheel-receiving indent receives at least part of a respective wheel located inwardly of the ski. In another aspect, during ski deployment, the indent-seated wheels extend partly below a bottom of the ski.

In another aspect, each ski is configured at its front tip and rear tip with a respective latch-receiving notch formed at a lower side thereof. A latch is configured to selectively, releasably, and securely engage each latch-receiving notch. The latch is one of a pawl, dog, or catch. In one form, the latch includes a catch having a beveled surface configured to facilitate capture and/or seating of the catch within the latch-receiving notch. A spring-loaded mechanism is configured to selectively actuate the latch.

In another aspect, a support device is configured to support each ski during deployment. In one form, each support leg has a jointed, multi-link construction movable between an extended, ski-supporting configuration and a collapsed, ski-stowing configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
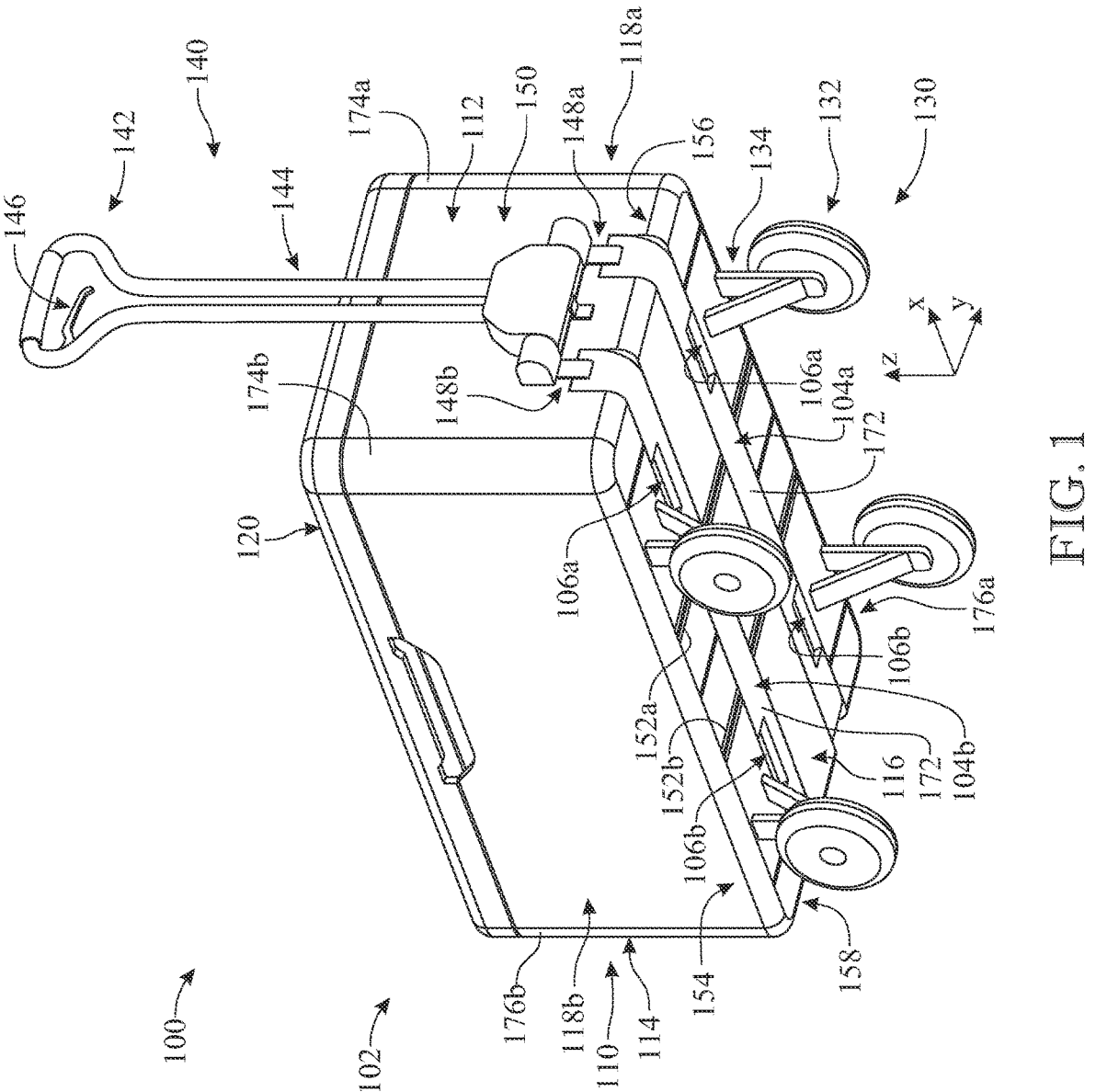
FIG. 1 presents a front, bottom, side perspective view of a mobile, ski-carrying wheeled unit in accordance with a first illustrative embodiment of the present invention, showing a pair of bottom-mounted skis in their stowed, retracted position during wheeled movement of the mobile unit.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a hand-drawn or hand-pulled mobile unit configured to alternately and selectively provide wheeled travel and sliding-type travel. In one form, the mobile or portable unit includes a food chest or cooler adapted for wheeled, vehicle-style travel using an arrangement of wheels. The mobile unit is further adapted with a pair of side-mounted or bottom-mounted skis carried by the container body. The skis are movable between a stowed position and a deployed position. In the stowed position, the skis are retained within recesses formed in the side or bottom of the container body, ensuring that the stowed skis do not protrude as an obstruction and catch on anything in the exterior environment as the mobile unit moves in its wheeled operation. In the deployed position, the skis are positioned below the container bottom and function as ski or sled runners to facilitate sliding travel of the mobile unit, replacing the wheels as the main contact surface with the ground. The wheel-based mobility is suited for travel on hard or semi-hard surfaces, such as roads, paved surfaces, and hard-packed dirt paths. The ski-based mobility is suited for travel on softer surfaces or ground material that easily yields, such as sand and snow. The ski-based mobility is also suited for travel on smooth surfaces that provide insufficient traction and frictional resistance for wheeled travel, such as ice.

Figure 2:
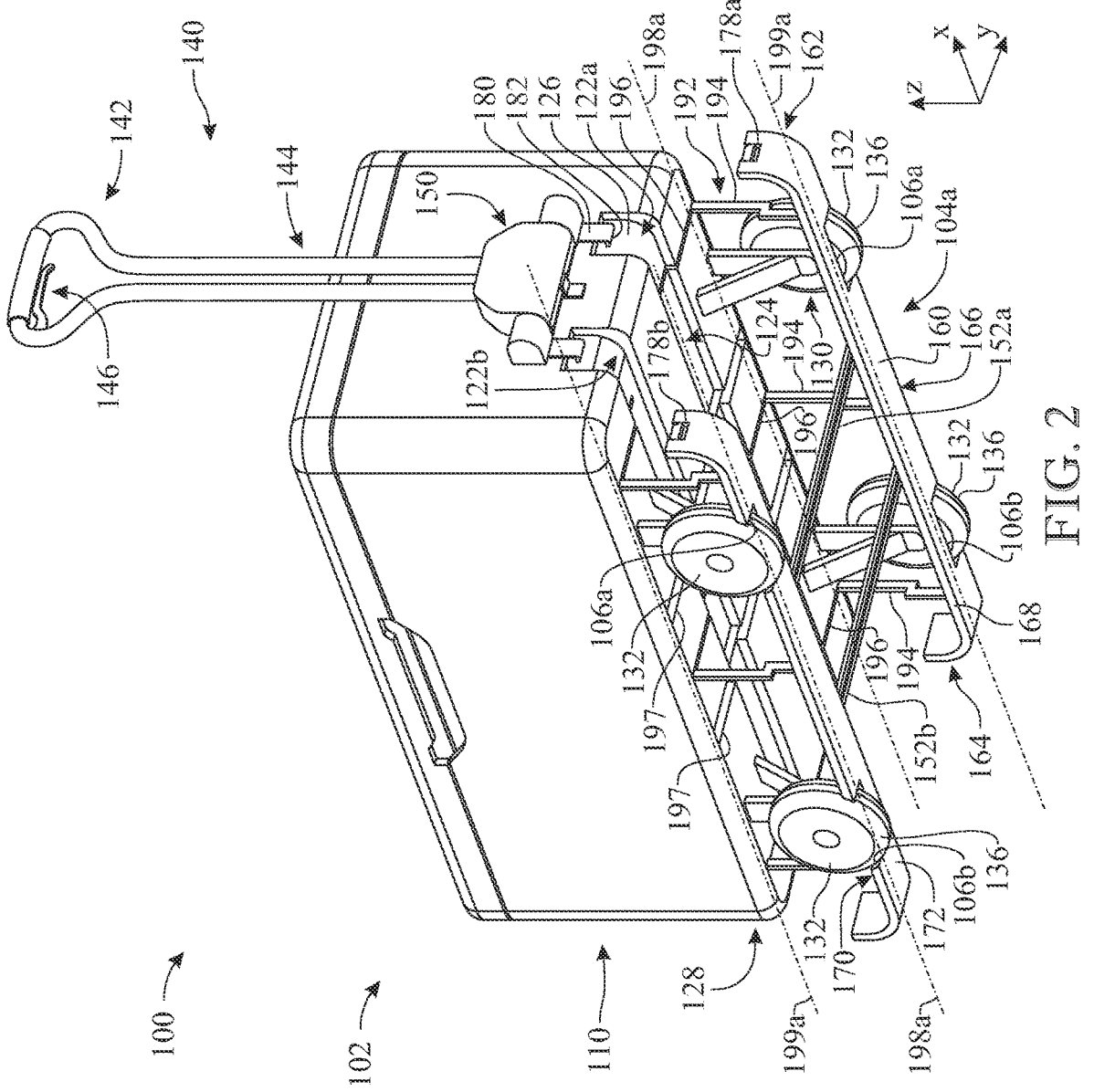
FIG. 2 presents a front, bottom, side perspective view of the mobile, ski-carrying wheeled unit illustrated in FIG. 1, showing the pair of skis in their deployed, extended position during sliding movement of the mobile unit.
Figure 3:
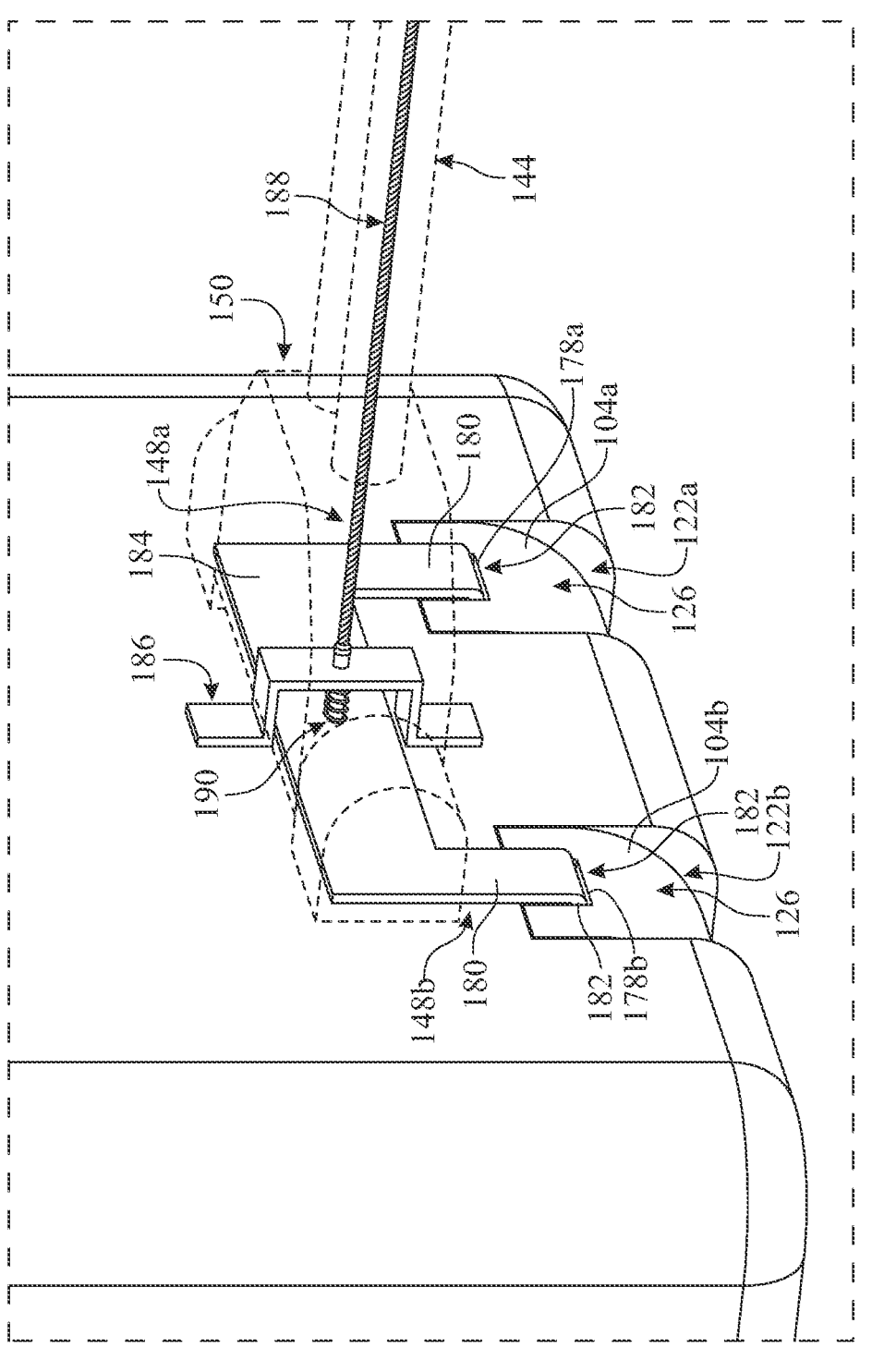
FIG. 3 presents a sectional perspective view of the handle assembly for the mobile, ski-carrying wheeled unit illustrated in FIGS. 1 and 2, showing in phantom partial view the cabling portion of the hand-operated actuator configured to control the alternate positions of the skis.

Referring initially to FIGS. 1-3, a wheeled carrier incorporating ski travel, hereinafter referred to as carrier 100, is disclosed according to a first exemplary embodiment of the present invention. The carrier 100 includes a mobile, wheel-equipped chest or container 102, which may serve as a cooler, and a pair of deployable right and left-side skis 104a,b carried by container 102 and disposed in a bottom-mounted relationship to container 102. As discussed further, the pair of skis 104a,b are selectively movable between a stowed position during a wheeled mode of travel (FIG. 1), and a deployed position during a sliding, sled-like mode of travel (FIG. 2). During their deployment, the skis 104a,b are configured to function as sled-type runners that support and bear the weight of container 102.

The container 102 may have a conventional construction including a container body 110 and a lid 120 separably or hingedly attached to container body 110. The container body 110 of the present embodiment has a generally rectangular construction including a front side 112, a rear side 114, a bottom side 116, and a pair of right and left sides 118a,b extending between front side 112 and rear side 114. The sides of container body 110 of the present embodiment have a generally planar construction. The container 102 defines an interior loading space, volume or enclosure to receive, store, and optionally cool contents, such as food and beverages. The container body 110 includes a bottom edge perimeter 154, including a front bottom horizontal edge 156 and a rear bottom horizontal edge 158. The container body 110 further includes a front right vertical edge 174a, a front left vertical edge 174b, a rear right vertical edge 176a, and a rear left vertical edge 176b.

The container 102 is equipped with a wheel assembly 130 comprising a plurality of wheels 132 imparting rolling mobility to the container 102. In some embodiments, each wheel 132 may be configured for independent movement. In some embodiments, the wheel assembly 130 may be at the bottom side 116 of the container body 110. For example, the wheels 132 of the wheel assembly 130 of the present embodiment are specifically located generally at each respective corner of container body 110 at the bottom side 116. The wheels 132 may be disposed such that two wheels 132 are located in the back, spaced apart from one another, and two wheels 132 are located at the front of the bottom side 116, also spaced apart from one another. Each wheel 132 may be supported, and attached to the container body 110 at the bottom side 116, by a respective, wheel mounting support 134. In some embodiments, such as the present embodiment, the wheel mounting support 134 of each wheel 132 secures the wheel 132 to the container body 110 at a fixed position, i.e. the wheel 132 is rotatable but otherwise fixed with respect to the container body 110. The wheel assembly 130 can be made according to any suitable design, such as a conventional design known to those skilled in the art. For example, the wheel arrangement depicted herein, comprising the aforementioned pair of spaced-apart rear wheels and pair of spaced-apart front wheels, configure the container 102 as a wheeled unit functioning similarly to a mobile wagon or cart. The wheel arrangement configures container 102 as a non-motorized, vehicle-style configuration capable of transporting contents loaded into container 102. The wheel design of container 102 is preferably non-axled, in which each wheel 132 is independently movable. Alternately, a pair of front and rear axles can be used to couple together the front wheels and rear wheels, respectively. For durability purposes and to minimize maintenance, the wheel assembly 130 preferably uses a solid (non-inflating) wheel 132, although an inflatable tire can also be used.

The carrier 100 is manually hand-powered or hand-drawn by a handle assembly 140. The handle assembly 140 includes a distal handle 142 and a handle arm 144 pivotally connected to the container body 110 via a pivot link or pivot axis enclosed within a housing assembly 150. The pivot link enables the handle assembly 140 to pivot or rotate into a suitable orientation that facilitates the user moving carrier 100 via a pulling action exerted on container 102 at handle assembly 140. A suitable releasable latch or lock can be used to temporarily hold or fasten the handle assembly 140 to container body 110 in an upright position, until it is disengaged during use. The latch may be released once the user desires to maneuver the carrier 100 with handle assembly 140. The handle assembly 140 can be provided in any suitable form well known to those skilled in the art. In one form, the handle assembly 140 can have a collapsible or telescoping design.

The pair of skis 104a,b have a conventional construction and can include any type of snow ski, including, but not limited to, racing, freestyle, carving, big mountain, all-mountain, powder, freeride, cross-country, downhill, and alpine. The skis 104a,b can also be implemented with suitable water skis. The skis 104a,b are preferably an associated set of paired or tandem skis, i.e., the skis 104a,b are preferably a matched set. With reference to FIG. 2, the skis 104a,b of the present embodiment have a similar construction, so that reference to one of them applies equally to the other. Illustrative skis 104a,b conventionally include an elongate, main ski body 160, which may extend along a front-to-back, longitudinal direction x. The ski 104a,b may include a curved nose tip or front tip 162 at a front end of main ski body 160, and a curved tail tip or rear tip 164 at an opposite, rear end of main ski body 160. The skis 104a,b further include an outer edge 166, an inner edge 168, an upper or top side 170, and a lower or bottom side 172. The main ski body 160 extends between the front tip 162 and rear tip 164 and conventionally includes a base area and a deck area. In one form, the skis 104a,b are adapted, modified, or otherwise provided in a configuration to minimize or eliminate the camber in order to ensure maximal contact between skis 104a,b and the ground surface, during deployment of skis 104a,b The skis 104a,b of the present embodiment are not equipped or fitted with any binding equipment, brakes, or brake arms.

With reference to FIG. 2, the body 110 of container 102 includes, at its bottom side 116, a pair of ski-receiving recesses or grooves 122a,b configured to retain and stow the pair of skis 104a,b, respectively. The ski-receiving recesses 122a,b have a similar construction, so that reference to one of them applies equally to the other. Each ski-receiving recess 122a,b is sized, shaped and dimensioned to seat a respective one of the pair of skis 104a,b. Specifically, the right-side ski 104a is seated in recess 122a and the left-side ski 104b is seated in recess 122b. In some embodiments, the ski-receiving recesses 122a,b have a complementary form to the pair of skis 104a,b. For example, each ski-receiving recess 122a,b of the present embodiment includes an elongate, longitudinally-extending, main recess portion 124 formed in the bottom side 116 of container body 110, a vertically-extending, nose-tip- or front-tip-receiving recess portion 126 formed in the front side 112 of container body 110, and a vertically-extending, tail-tip- or rear-tip-receiving recess portion 128 formed in the rear side 114 of container body 110 (the rear-tip-receiving recess portion 128 may be formed generally symmetrical to the front-tip-receiving recess portion 126. Each ski-receiving recess 122a,b forms a continuous, uninterrupted space to accommodate placement of a respective ski 104a,b. In a preferred configuration, the ski-receiving recesses 122a,b are formed with a sufficient depth such that the bottom side 172 of each stowed-away ski 104a,b is substantially flush or level with the bottom side 116, front side 112, and rear side 114 (in a symmetrical manner to the front side 112) of container body 110, as shown in FIG. 1. The ski-receiving recess 122a,b of the present embodiment wraps around the front bottom horizontal edge 156 and the rear bottom horizontal edge 158 of the bottom edge perimeter 154 of container body 110, as the recess 122a,b transitions from the bottom side 116 of container body 110 to the front side 112 and rear side 114, respectively, of container body 110.

In the stowed position, shown in FIG. 1, the skis 104a,b are seated in their respective recesses 122a,b such that the top side 170 of each one of the skis 104a,b faces the container body 110. In said stowed position, the elongate, main ski body 160, the front tip 162, and the rear tip 164 of each ski 104a,b are seated in the longitudinally-extending, main recess portion 124, the front-tip-receiving recess portion 126, and the rear-tip-shaped portion 128 of the corresponding ski-receiving recess 122a,b, respectively. The retention and stowage of skis 104a,b in the ski-receiving recesses 122a,b facilitates the wheeled operation of carrier 100, in which the user pulls the wheeled container 102 via handle assembly 140 and moves the wheeled container 102 by means of the rolling mobility provided to the wheeled container 102 by the set of wheels 132 in wheel assembly 130.

As shown in FIG. 1, each one of the skis 104a,b is provided with a set of spaced-apart front and rear wheel-receiving indents 106a,b formed in the outer edge 166 and towards the inner edge 168 of the main ski body 160 of the ski 104a,b. During deployment, shown in FIG. 2, the lowered skis 104a,b are positioned inboard of each wheel assembly 130, with each indent 106a,b receiving a respective wheel 132. For example, in the right-side ski 104a, the front indent 106a receives the right front wheel 132, and the rear indent 106b receives the right rear wheel 132. As shown, once each wheel 132 is seated within its respective wheel-receiving indent 106a,b, a lower part 136 of wheel 132 extends downward below the lower side 172 of ski 104a,b. As a result, during operation, a type of hybrid support is available using wheels 132 and skis 104a,b. The deployed skis 104a,b provide the primary contact surface with the ground surface, enabling the carrier 100 to move in a sliding motion in a sled-like manner. Since the wheels 132 project below the lower side 172 of the deployed skis 104a,b, the wheels 132 can provide some traction if needed.

Referring to FIG. 3, the skis 104a,b are releasably stowed in their corresponding ski-receiving recesses 122a,b using a latch mechanism including a front right and a front left ski latch assembly 148a,b. Each latch assembly 148a,b includes a latch arm 180 and a beveled catch 182 disposed at the distal end of latch arm 180. The pair of latch arms 180 are connected via a central plate 184 and move in unison. A raised bracket 186 is mounted over the central plate 184. A spring-loaded cable 188 is inserted through the bracket 186 and fitted at one end with a spring 190 that is normally biased to exert pressure against central plate 184, which maintains the pair of latch arms 180 in a latching position, shown in FIG. 3. The other end of cable 188 is connected to a hand-operated actuator 146, which operates latch assembly 148a,b via cable 188. The skis 104a,b are respectively provided with a pair of front latch-receiving notches 178a,b (FIG. 2) formed in the front tip 162 at lower side 172. The latch-receiving notches 178a,b are designed to capture and seat the respective beveled catches 182 of the latch assemblies 148a,b.

In order to stow skis 104a,b, the skis 104a,b are raised towards the bottom side 116 of container body 110 in alignment with the pair of ski-receiving recesses 122a,b. As the skis 104a,b are maneuvered into place within the ski-receiving recesses 122a,b, the front tip 162 of ski 104a,b encounters the beveled catch 182 of latch assembly 148a,b. The beveled catch 182 has a sloping contact surface. The front edge of front tip 162 of ski 104a,b slides against the sloping contact surface of beveled catch 182, which slightly pivots the latch arm 180 outwardly against the biasing action of spring 190 to make room for front tip 162 to seat in the front-tip-receiving recess portion 126 of ski-receiving recesses 122*a,b*. As the front edge of ski front tip 162 advances along the sloping contact surface of beveled catch 182, the beveled catch 182 eventually falls and snaps into place within the latch-receiving notches 178*a,b* formed in the bottom side 172 of skis 104*a,b* at their front tip 162. The location of beveled catch 182 within the latch-receiving notches 178*a,b* of skis 104*a,b* helps retain and hold the skis 104*a,b* in place in a stowed position in ski-receiving recesses 122*a,b*. The skis 104*a,b* hang suspended on the latch arms 180 via the seated capture of beveled catch 182 within latch-receiving notches 178*a,b*. When the user or operator desires to release the skis 104*a,b* from their stowed position, the user actuates actuator 146, which pulls on the spring-loaded cable 188 and consequently pivots the central plate 184, causing the latch arms 180 to likewise pivot outward (frontward). The pivoting of latch arms 180 causes the beveled catch 182 to move out of its seated occupancy within the latch-receiving notches 178*a,b* of skis 104*a,b*, thereby releasing the skis 104*a,b* from their latched arrangement and enabling the skis 104*a,b* to be deployed.

With reference to FIG. 2, each one of the skis 104*a,b* is equipped with a ski support assembly 192, which supports the skis 104*a,b* in the depicted position relative to the wheels 132 and container body 110 during deployment. In some embodiments, the ski support assembly 192 may be pivotably connected to the container body 110 and the corresponding ski 104*a,b* about first and second rotation axes 198*a* and 199*a*. The rotation axes 198*a*, 199*a* may be parallel to one another, and preferably arranged in the front-to-back, longitudinal direction x. Each first rotation axis 198*a* may be generally fixed with respect to the container body 110, and the corresponding, second rotation axis 199*a* may pivot about the first rotation axis 198*a* when switching the skis 104*a,b* between the deployed and stowage positions.

The ski support assembly 192 can be implemented with any suitable construction or design well known to those skilled in the art. In one form, for example, the ski support assembly 192 can include a set of spaced-apart support arms or legs 194 that extend from the bottom side 116 of container body 110 to the upper side 170 of skis 104*a,b*. In some embodiments, each support leg 194 may be connected to the container body 110 and the corresponding ski 104*a,b* at respective, first and second articulated connections defining the first and second rotation axis 198*a* and 199*a*, respectively.

In some embodiments, the support legs 194 may be generally rigid and may be rigidly pivotable about the rotation axes 198*a*, 199*a*. In another embodiment, the support legs 194 may have a jointed or articulated multi-link body that straightens and locks into place at full extension, defining a generally linear structure (which may be arranged along a vertical direction z, perpendicular to longitudinal direction x and to a left-to-right, transverse direction y, as shown) to support skis 104*a,b* during deployment; the connecting linkage of support legs 194 may selectively and alternatively be folded or collapsed to facilitate stowage. As shown in FIG. 2, corresponding recesses 196 may be provided in the bottom side 116 of container body 110; as shown in FIG. 1, the recesses 196 may receive the support legs 194 when the skis 104*a,b* are stowed. During deployment, after the skis 104*a,b* are released from stowage, in embodiments in which the support legs 194 are foldable or collapsible, the folded support legs 194 may be unfolded and arranged in full extension, with adjacent links of support leg 194 locked into place with an adjustable or releasable locking mechanism well known to those skilled in the art. The support leg 194 adopts the extended configuration during ski deployment, and adopts the collapsed configuration during ski stowage. In the deployed position, the skis 104*a,b* are located inboard location relative to wheels 132.

In some embodiments, such as the present embodiment, the support legs 194 may be pivotably connected to both the container body 110 and the skis 104*a,b* such that the lower side 172 of the skis 104*a,b* remains generally parallel to the ground (horizontal, in the depicted position) both in the stowage position and the deployed position. In such configuration, the transition from the stowed position to the deployed configuration does not entail any needed rotation of skis 104*a,b* relative to the container body 110 to deploy and stow the skis 104*a,b*, since the skis 104*a,b* as stowed are oriented in the same way as what is needed for deployment.

The illustration of FIG. 1 discloses a wheeled mode of transportation, in which the pair of skis 104*a,b* are stowed at the underside or bottom 116 of container body 110 in their ski-receiving recesses 122*a,b*. In the adopted configuration of FIG. 1, carrier 100 travels using the assistance of wheels 132. In turn, the illustration of FIG. 2 discloses a sliding mode of transportation, in which the pair of skis 104*a,b* are released from their stowed position and deployed as sled-like runners. In the adopted configuration of FIG. 2, carrier 100 travels using skis 104*a,b* to facilitate a sliding motion. A pair of transverse-extending and ski-supporting cross-braces 152*a,b* are mounted transversally or cross-wise to skis 104*a,b*. The cross-braces 152*a,b* span between and mount to skis 104*a,b* at their upper side 170. The cross-braces 152*a,b* provide stability to the skis 104*a,b* and help maintain their horizontal orientation and/or spaced-apart relationship. The cross-braces 152*a,b* can be implemented in any suitable conventional form well known to those skilled in the art. In one form, the cross-braces 152*a,b* include a structure having an elongate slot that receives guide pins mounted to the upper side 170 of skis 104*a,b*. In this way, the skis 104*a,b* can be shifted closer to one another for stowage, allowing the cross-braces 152*a,b* to remain in place as the guide pins move inwardly through the slot and keep the cross-braces 152*a,b* attached to skis 104*a,b*. As the skis 104*a,b* deploy, the guide pins move outwardly through the slot and maintain the transverse orientation of the cross-braces 152*a,b*. In the stowed configuration, shown in FIG. 1, the cross-braces 152*a,b* may be received within corresponding recesses 197 formed in the bottom side 116 of the container body 110.

Figure 4:
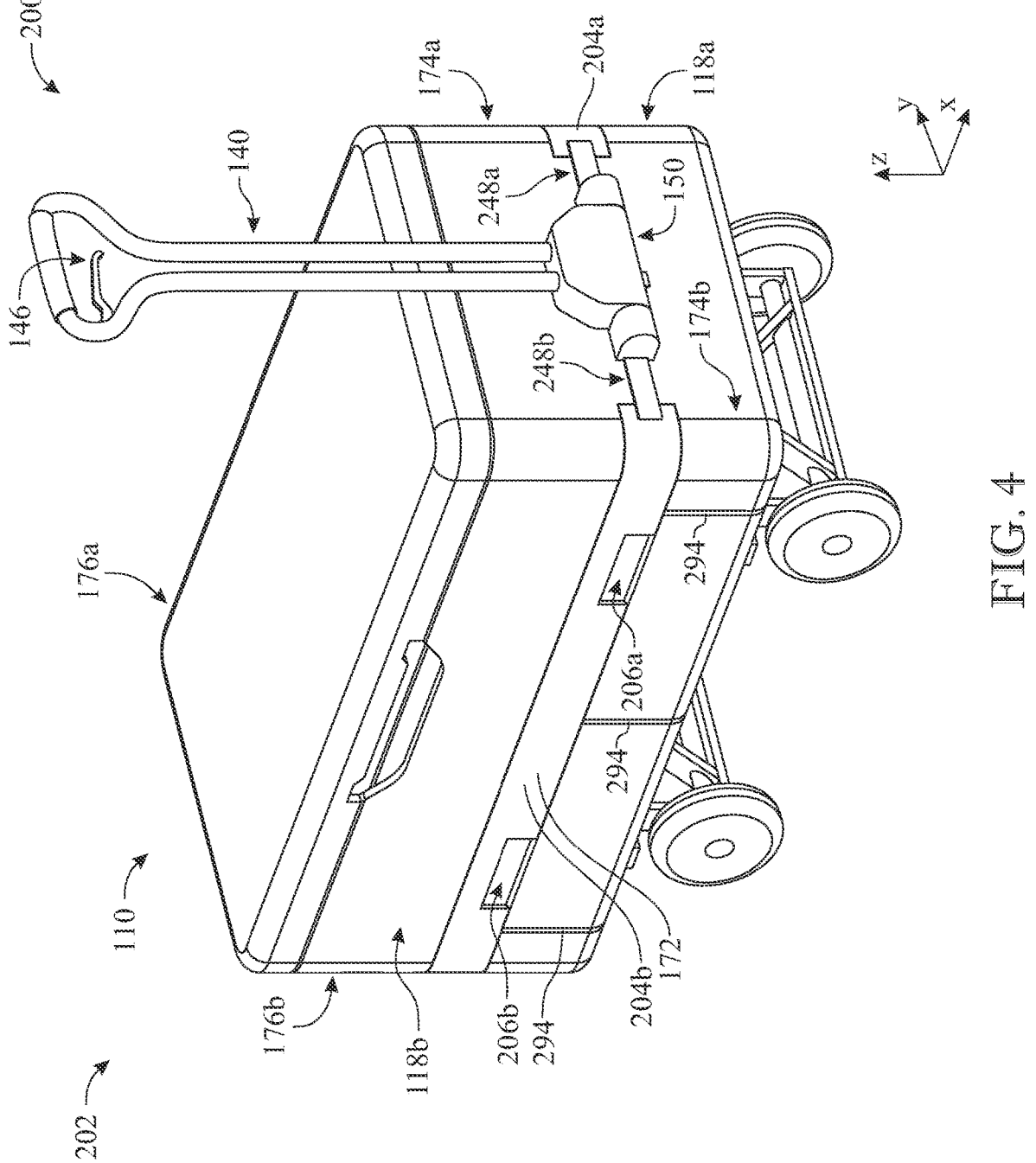
FIG. 4 presents a front, upper, side perspective view of a mobile, ski-carrying wheeled unit in accordance with a second illustrative embodiment of the present invention, showing a pair of side-mounted skis in their stowed, retracted position during wheeled movement of the mobile unit.
Figure 5:
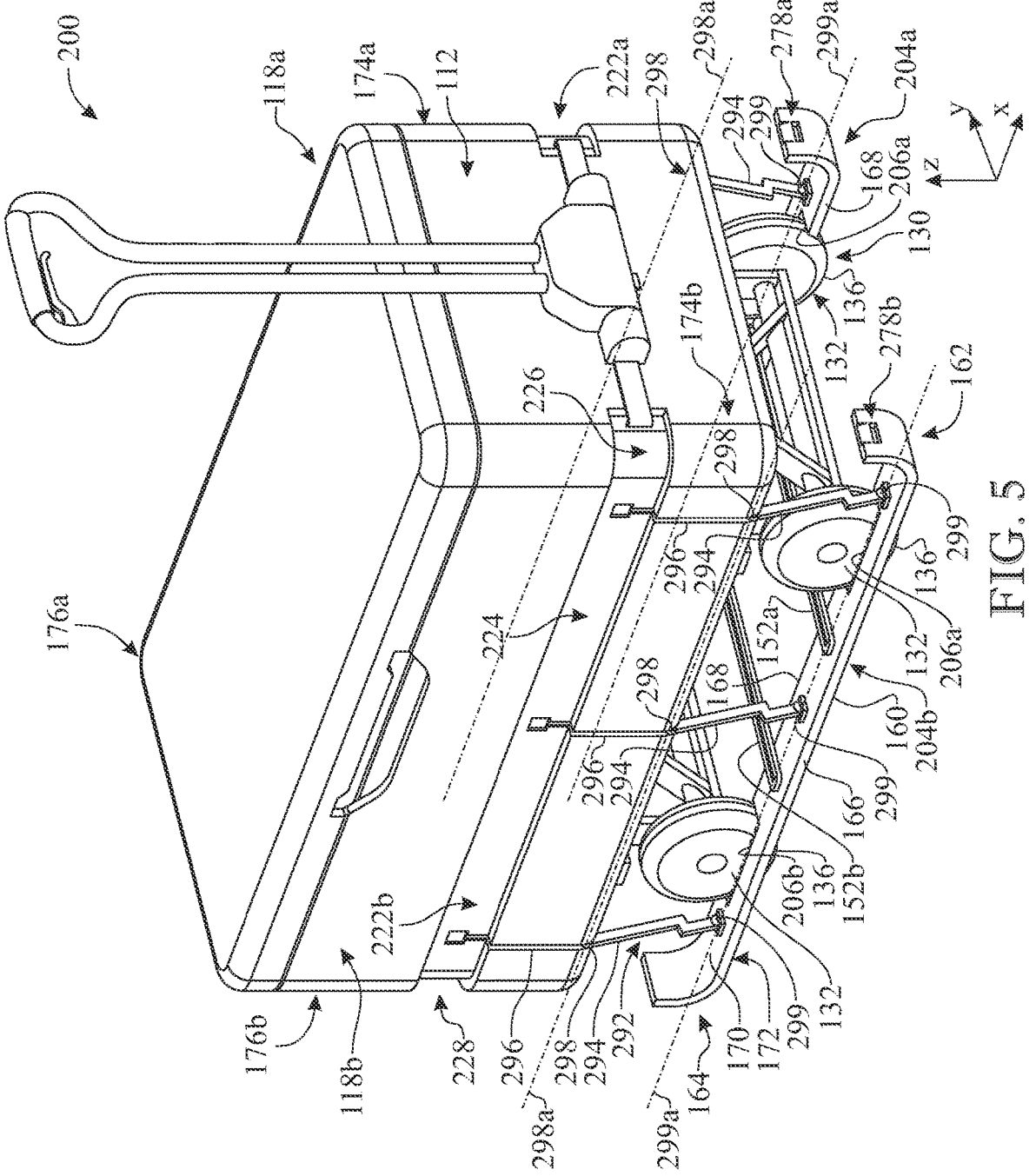
FIG. 5 presents a front, upper, side perspective view of the mobile, ski-carrying wheeled unit illustrated in FIG. 4, showing the pair of skis in their deployed, extended position during sliding movement of the mobile unit.
Figure 6:
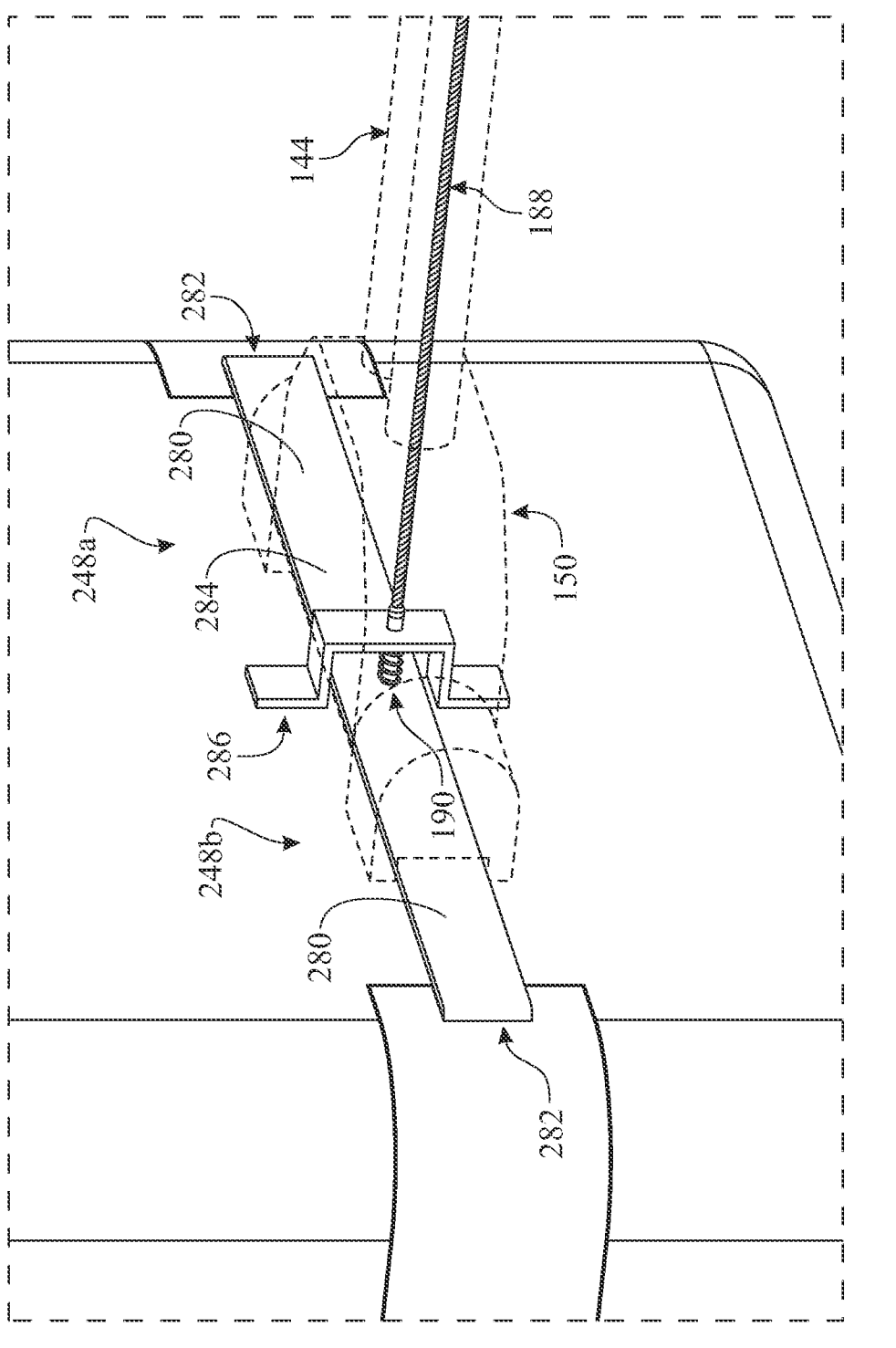
FIG. 6 presents a sectional perspective view of the handle assembly for the mobile, ski-carrying wheeled unit illustrated in FIGS. 4 and 5, showing in phantom partial view the cabling portion of the hand-operated actuator configured to control the alternate positions of the skis.

Referring now to FIGS. 4-6, a wheeled carrier incorporating ski travel, hereinafter referred to as carrier 200, is disclosed according to a second exemplary embodiment of the present invention. Elements of carrier 200 similar to corresponding elements of carrier 100 disclosed in FIGS. 1-3 are identified with the same reference number. Similarly to the previous embodiment, the carrier 200 of the present embodiment includes a container 202, which may carry food, beverages and/or other items, and in some embodiments may include a cooler. Also similarly to the previous embodiment, the container 202 is provided with set of wheels 130 and a pair of right-side and left-side skis 204*a,b*. The carrier 200 is similar to carrier 100 disclosed in FIGS. 1-3, except that the pair of right-side and left-side skis 204*a,b* are side-mounted to container 202. In particular, the pair of right and left-side skis 204*a,b* are disposed in a lateral or side-mounted relationship to container 202 at the right and left sides 118*a,b* of the container 202. The pair of skis 204*a,b* are movable between a stowed position during a wheeled mode of travel (FIG. 4), and a deployed position during a sliding, sled-like mode of travel (FIG. 5). In the deployed position (FIG. 5), the skis 204a,b are configured to function as sled-type runners that support and bear the weight of container 202. The skis 204a,b are generally identical to skis 104a,b disclosed in FIGS. 1-3. However, unlike the previous embodiment, the skis 204a,b of the present embodiment incorporate a pair of spaced-apart, wheel-receiving indents 206a,b at the inner edge 168 of the skis 204a,b, the wheel-receiving indents 206a,b extending towards the outer edge 266 of the skis 204a,b. In another difference, the skis 204a,b of the present embodiment are arranged transversely outward of the wheel assembly 130 (i.e. outward of the wheel assembly 130 along transverse direction y). Furthermore, the skis 204a,b of the present embodiment change orientations when switching between the stowed and deployed positions; specifically, as shown, the main ski body 160 is arranged in a generally vertical orientation in the stowed position (FIG. 4) and is instead arranged generally horizontal in the deployed position (FIG. 5). In some embodiments, as shown, the skis 204a,b may be pivotably connected to the container body 210 by ski support assemblies 292, described in greater detail hereinafter, wherein the ski support assemblies 292 may facilitate such change in orientation.

In turn, the container 202 of the present embodiment similar to the container 102 disclosed in FIGS. 1-3. However, the body 110 of the container 202 of the present embodiment includes, at its right and left sides 118a,b, a pair of ski-receiving recesses or grooves 222a,b configured to retain and stow the pair of skis 204a,b, respectively. The ski-receiving recesses 222a,b have a similar construction, so reference to one of them applies equally to the other. Each ski-receiving recess 222a,b is sized, shaped and dimensioned to receptively seat a respective one of the pair of skis 204a,b. For this purpose, the ski-receiving recesses 222a,b have a complementary form to the pair of skis 204a,b. The right-side ski 204a is seated in recess 222a formed in right side 118a of container body 210, and the left-side ski 204b is seated in recess 222b formed in left side 118b of container body 210. Each ski-receiving recess 222a,b includes an elongate, longitudinally-extending, main recess portion 224 formed respectively in the right and left sides 218a,b of container body 110, a horizontally-extending, front-tip-receiving recess portion 226 formed in the front side 112 of container body 110, and a horizontally-extending, rear-tip-receiving recess portion 228 (which may be a mirror of the front-tip-receiving recess portion 226) formed in the rear side 114 of container body 110. Each ski-receiving recess 222a,b forms a continuous, uninterrupted space to accommodate placement of a respective ski 204a,b. In a preferred configuration, as shown in FIG. 4, the recesses 222a,b are formed with a sufficient depth such that the bottom side 172 of each stowed-away ski 204a,b is substantially flush or level with the right and left sides 118a,b, front side 112, and rear side 114 of container body 110. As further shown in FIG. 5, the left-side ski-receiving recess 222b wraps around the front left vertical edge 174b and the back left vertical edge 176b, as the recess 222b transitions from the left side 118b of container body 110 to the front side 112 and rear side 114, respectively, of container body 110. Similarly, the right-side ski-receiving recess 222a, which may be symmetrical to the left-side ski-receiving recess 222b, wraps around the front right vertical edge 174a and the back right vertical edge 176a, as the recess 222a transitions from the right side 118a of container body 110 to the front side 112 and rear side 114, respectively, of container body 110.

In the stowed position of FIG. 4, the skis 204a,b are seated in their respective ski-receiving recesses 222a,b such that the top side 170 of each one of the skis 204a,b faces the container body 110, and the rear side 172 faces outward of, and is optionally flush with, the container body 110. In the stowed position, the main elongate, main ski body 160 of each ski 204a,b is seated in the longitudinally-extending, main recess portion 224 of the corresponding ski-receiving recess 222a,b, the front tip 162 of each ski 204a,b is seated in the front-tip-receiving recess portion 226 of the corresponding ski-receiving recess 222a,b, and the rear tip 164 of each ski 204a,b is seated in the rear-tip-receiving recess portion 228 of the corresponding ski-receiving recess 222a, b. The retention and stowage of skis 204a,b in the ski-receiving recesses 222a,b facilitates the wheeled operation of carrier 200, in which the user pulls the wheeled container 202 via handle assembly 240 and moves it under the rotary assistance of the set of wheels 132, which may be rotatably but otherwise fixedly mounted to the container body 210.

Similarly to the previous embodiment, each ski 204a,b is provided with the set of spaced-apart front and rear wheel-receiving indents 206a,b; however, as mentioned heretofore, unlike the previous embodiment, the front and rear wheel-receiving indents 206a,b of the present embodiment are formed in the inner ski edge 168. During deployment, as shown in FIG. 5, the lowered skis 204a,b are positioned outboard of each wheel assembly 130, with each indent 206a,b receiving a respective wheel 132 of the wheel assembly 132. For example, in the left-side ski 204b, the front indent 206a receives the left front wheel 132, and the rear indent 206b receives the left rear wheel 132. As shown, once wheel 132 is seated within its respective wheel-receiving indent 206a,b, a lower part 136 of wheel 132 extends below the lower side 172 of ski 204a,b. As a result, during operation, a type of hybrid support is available using wheels 132 and skis 204a,b. The deployed skis 204a,b provide the primary contact surface with the ground surface, enabling the carrier 200 to move in a sliding motion in a sled-like manner. Since the wheels 132 project below the lower side 172 of the deployed skis 204a,b, the wheels 132 can provide some traction if needed.

Referring to FIGS. 4 and 6, the skis 204a,b are releasably stowed in their corresponding ski-receiving recesses 222a,b using a latch mechanism including a front right latch assembly 248a and a front left ski latch assembly 248b. Each latch assembly 248a,b includes a latch arm 280 and a beveled catch 282 disposed at the distal end of latch arm 280. The pair of latch arms 280 are connected via a central plate 284 and move in unison. A raised bracket 286 is mounted over the central plate 284. A spring-loaded cable 188 is inserted through the bracket 286 and fitted at one end with a spring 190 that is normally biased to exert pressure against central plate 284 towards the container body 210, which maintains the pair of latch arms 280 in a latching orientation or position. The other end of cable 188 is connected to a hand-operated actuator 146, which operates the latch assemblies 248a,b via cable 188. The skis 204a,b are respectively provided with a pair of front latch-receiving notches 278a,b (FIG. 5) formed in the ski front tip 162 at lower side 172. The latch-receiving notches 278a,b are designed to capture and seat the beveled catch 282 in the latching orientation or position of the pair of latch arms 280 of latch assembly 248a,b.

In order to stow the skis 204a,b, the skis 204a,b are pivotally positioned at container sides 118a,b in alignment with the pair of ski-receiving recesses 222a,b. As the skis 204a,b are maneuvered into place within ski-stowage recesses 222*a,b*, the front tip 162 of each ski 204*a,b* encounters the beveled catch 282 of latch assembly 248*a,b*. The front edge of front tip 162 of ski 204*a,b* slides against a sloping contact surface of the beveled catch 282, which slightly displaces the latch arm 280 outwardly against the biasing action of spring 190 to make room for front tip 162 to seat in the front-tip-receiving recess portion 226 of the corresponding ski-receiving recess 222*a,b*. As the front edge of ski front tip 162 advances along the sloping contact surface of beveled catch 282, the beveled catch 282 eventually falls and snaps into place within the corresponding latch-receiving notch 278*a,b* formed in the bottom side 172 of the corresponding ski 204*a,b* at its front tip 162. The location of beveled catch 282 within the latch-receiving notch 278*a,b* of the corresponding ski 204*a,b* helps retain and hold the skis 204*a,b* in place in a stowed position in ski-receiving recesses 222*a,b*, as shown in FIGS. 4 and 6. When the user desires to release skis 204*a,b* from their stowed position, the user actuates the hand-operated actuator 146, which pulls on the spring-loaded cable 188 and consequently pulls the central plate 284, causing the latch arms 280 to separate from the front tips 162 of the skis 204*a,b*. The shifting of the latch arms 280 causes the beveled catch 282 to move out of its seated occupancy within the latch-receiving notches 278*a,b* of skis 204*a,b*, thereby releasing the skis 204*a,b* from their latched arrangement and enabling the skis 204*a,b* to be deployed. Once released, the skis 204*a,b* are rotated out and down from their stowed position until they occupy an outboard location relative to wheels 132 (FIG. 5).

As mentioned heretofore, each one of the skis 204*a,b* is equipped with a ski support assembly 292, which supports the skis 204*a,b* during deployment (FIG. 5). In some embodiments, the ski support assembly 292 may be pivotably connected to the container body 210 and the corresponding ski 204*a,b* about first and second rotation axes 298*a* and 299*a*. The rotation axes 298*a*, 299*a* may be parallel to one another, and preferably arranged in the front-to-back, longitudinal direction x. Each first rotation axis 298*a* may be generally fixed with respect to the container body 210, and the corresponding, second rotation axis 299*a* may pivot about the first rotation axis 298*a* when switching the skis 204*a,b* between the deployed and stowage positions.

The ski support assembly 292 can be implemented with any suitable construction or design well known to those skilled in the art. In one form, for example, the ski support assembly 292 can include a set of spaced-apart support arms or legs 294 that are connected at one end to container body 110 and connected at another end to the upper side 170 of skis 204*a,b*. In some embodiments, each support leg 294 may be connected to the container body 210 and the corresponding ski 204*a,b* at respective, first and second articulated connections 298 and 299. The first articulated connections 298 of the support legs 294 may define the first rotation axis 298*a*, and the second articulated connections 299 of the support legs 294 may define the second rotation axis 299*a*.

In some embodiments, the support legs 294 may be generally rigid and may be rigidly pivotable about the rotation axes 298*a*, 299*a*. In another embodiment, the support legs 294 may have a jointed or articulated multi-link body that straightens and locks into place at full extension, defining a generally linear structure to support skis 204*a,b* during deployment; the connecting linkage of support legs 294 may be folded or collapsed to facilitate stowage. As shown in FIG. 5, corresponding recesses 296 may be provided in the sides 118*a,b* of container body 110 to receive the support legs 294 in the stowed position. During deployment, after the skis 204*a,b* are released from stowage, in embodiments in which the support legs 294 are foldable or collapsible, the support legs 294 may be unfolded and arranged in full extension, with adjacent links of support leg 294 locked into place with an adjustable or releasable locking mechanism well known to those skilled in the art. The support leg 294 adopts the extended configuration during ski deployment, and adopts the collapsed configuration during ski stowage. In the deployed position, the skis 204*a,b* are located outboard relative to wheels 132.

The illustration of FIG. 4 discloses a wheeled mode of transportation, in which the pair of skis 204*a,b* are stowed at the right and left sides 118*a,b* of container body 110 in their ski-receiving recesses 222*a,b*. In the configuration of FIG. 4, carrier 200 travels using the assistance of wheels 132. In turn, the illustration of FIG. 5 discloses a sliding mode of transportation, in which the pair of skis 204*a,b* are released from their stowed position and deployed as sled-like runners. In the configuration of FIG. 5, carrier 200 travels using skis 204*a,b* to facilitate a sliding motion. A pair of transverse-extending and ski-supporting cross-braces 152*a,b* are mounted transversally (along transverse direction y) or cross-wise to skis 204*a,b*. The cross-braces 152*a,b* span between and mount to skis 204*a,b* at their upper side 170. The cross-braces 152*a,b* provide stability to the skis 204*a,b* and help maintain their spaced-apart relationship and/or deployed position. The cross-braces 152*a,b* can be implemented in any suitable conventional form well known to those skilled in the art. In one form, the cross-braces 152*a,b* include a structure having an elongate slot that receives guide pins mounted to the upper side 170 of skis 204*a,b*. In this way, the skis 204*a,b* can be fixed relative to one another in the deployed position.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An item carrier, comprising:
   a container configured to store at least one item;
   a set of wheels rotatably attached to the container;
   a pair of skis comprising a left-side ski and a right-side ski; and
   a ski support assembly securing the pair of skis to the container and operable to selectively reposition the pair of skis with respect to the container; wherein
   the item carrier is configured to selectively adopt, by operating the ski support assembly:
      a first configuration, in which the left-side and right-side skis are positioned in respective stowed positions and do not provide ski-travel ability to the container, and further in which the set of wheels provides rolling mobility to the container, and
      a second configuration, in which the left-side and right-side skis are positioned in respective deployed positions at which the pair of skis provides ski-travel mobility to the container,
   wherein the container comprises at least one ski-receiving recess, and further wherein, when the item carrier is arranged in the second configuration, the left-side ski and the right-side ski are received within said at least one ski-receiving recess and are flush with the container, and wherein the left-side and right-side skis comprise a respective main ski body and a respective tip, and further wherein the at least one ski-receiving recess comprises a main recess portion extending along a front-to-back, longitudinal side of the container and a tip-receiving recess portion extending along a left-to-right, transverse side of the container, and further wherein, when the item carrier is arranged in the second configuration, the main ski bodies and the tips are received, within the main recess portion and the tip-receiving portion of the at least one ski-receiving recess, respectively.

2. The item carrier of claim 1, wherein each wheel of the set of wheels is rotatably attached to the container at a respective, fixed position.

3. The item carrier of claim 1, wherein, when the item carrier is arranged in the second configuration, the set of wheels protrudes partially downward from the pair of skis.

4. The item carrier of claim 1, wherein, when the item carrier is arranged in the second configuration, the set of wheels is positioned within indentations formed in the left-side ski and the right-side ski.

5. The item carrier of claim 4, wherein, when the item carrier is arranged in the second configuration, the set of wheels protrudes partially downward from the indentations and from a respective bottom side of the left-side ski and the right-side ski.

6. The item carrier of claim 1, further comprising an actuator, hand-operable by a user to operate the ski support assembly to selectively reposition the pair of skis with respect to the container.

7. The item earner of claim 6, further comprising a spring-loaded latch mechanism operatively connected to the actuator and configured to selectively engage or disengage the ski support assembly responsively to operation of the actuator to respectively prevent or allow a repositioning of the pair of skis with respect to the container by the ski support assembly.

8. The item carrier of claim 1, wherein the set of wheels comprises at least one left-side wheel and at least one right-side wheel arranged closer to a left side and a right side of the container, respectively, wherein a space is defined between the at least one left-side wheel and the at least one right-side wheel, and further wherein the left-side and right-side skis are repositionable between the respective stowed positions and the respective deployed positions within said space.

9. The item carrier of claim 8, wherein the left-side and right-side skis in the respective stowed positions are positioned at a bottom side of the container.

10. The item carrier of claim 9, wherein the left-side and right-side skis are arranged in a same orientation in the respective stowed positions and the respective deployed positions.

11. The item carrier of claim 8, wherein the left-side and right-side skis in the respective deployed positions are positioned adjacent to an inner side of the at least one left-side wheel and an inner side of the at least one right-side wheel, respectively, the inner sides facing one another.

12. The item carrier of claim 11, wherein, when the item carrier is arranged in the second configuration, the at least one left-side wheel and the at least one right-side wheel are positioned within respective indentations formed in an outer side of the left-side ski and an outer side of the right-side ski, the outer sides facing away from one another.

13. The item carrier of claim 1, wherein the set of wheels is arranged between the left-side ski and the right-side ski such that the left-side ski and the right-side ski are repositionable with respect to the container between the respective stowed positions and the respective deployed positions externally of the set of wheels.

14. The item carrier of claim 13, wherein the left-side and right-side skis in the respective stowed positions are positioned at a left side and a right side of the container, respectively.

15. The item carrier of claim 13, wherein the left-side and right-side skis in the respective deployed positions are positioned adjacent to an outer side of the at least one left-side wheel and an outer side of the at least one right-side wheel, respectively, the outer sides facing away from one another.

16. The item carrier of claim 15, wherein, when the item carrier is arranged in the second configuration, the at least one left-side wheel and the at least one right-side wheel are positioned within respective indentations formed in an inner side of the left-side ski and an inner side of the right-side ski, the inner sides facing one another.

17. An item carrier, comprising:
a container configured to store at least one item;
a set of wheels rotatably attached to the container;
a pair of skis comprising a left-side ski and a right-side ski; and
a ski support assembly securing the pair of skis to the container and operable to selectively reposition the pair of skis with respect to the container; wherein
the item carrier is configured to selectively adopt, by operating the ski support assembly:
a first configuration, in which the left-side and right-side skis are positioned in respective stowed positions and do not provide ski-travel ability to the container, and further in which the set of wheels provides rolling mobility to the container, and
a second configuration, in which the left-side and right-side skis are positioned in respective deployed positions at which the pair of skis provides ski-travel mobility to the container;
wherein, when the item carrier is arranged in the second configuration, the set of wheels is positioned within indentations formed in the left-side ski and the right-side ski.

18. An item carrier, comprising:
a container configured to store at least one item;
a set of wheels rotatably attached to the container;
a pair of skis comprising a left-side ski and a right-side ski; and
a ski support assembly securing the pair of skis to the container and operable to selectively reposition the pair of skis with respect to the container; wherein
the item carrier is configured to selectively adopt, by operating the ski support assembly:
a first configuration, in which the left-side and right-side skis are positioned in respective stowed positions and do not provide ski-travel ability to the container, and further in which the set of wheels provides rolling mobility to the container, and
a second configuration, in which the left-side and right-side skis are positioned in respective deployed positions at which the pair of skis provides ski-travel mobility to the container;
wherein the set of wheels comprises at least one left-side wheel and at least one right-side wheel arranged closer to a left side and a right side of the container, respectively, wherein a space is defined between the at least one left-side wheel and the at least one right-side wheel, and further wherein the left-side and right-side skis are repositionable between the respective stowed positions and the respective deployed positions within said space;

wherein the left-side and right-side skis in the respective deployed positions are positioned adjacent to an inner side of the at least one left-side wheel and an inner side of the at least one right-side wheel, respectively, the inner sides facing one another; and wherein, when the item carrier is arranged in the second configuration, the at least one left-side wheel and the at least one right-side wheel are positioned within respective indentations formed in an outer side of the left-side ski and an outer side of the right-side ski, the outer sides facing away from one another.

19. An item carrier, comprising:

a container configured to store at least one item;

a set of wheels rotatably attached to the container;

a pair of skis comprising a left-side ski and a right-side ski; and a ski support assembly securing the pair of skis to the container and operable to selectively reposition the pair of skis with respect to the container; wherein the item carrier is configured to selectively adopt, by operating the ski support assembly:

a first configuration, in which the left-side and right-side skis are positioned in respective stowed positions and do not provide ski-travel ability to the container, and further in which the set of wheels provides rolling mobility to the container, and a second configuration, in which the left-side and right-side skis are positioned in respective deployed positions at which the pair of skis provides ski-travel mobility to the container;

wherein the set of wheels is arranged between the left-side ski and the right-side ski such that the left-side ski and the right-side ski are repositionable with respect to the container between the respective stowed positions and the respective deployed positions externally of the set of wheels;

wherein the left-side and right-side skis in the respective deployed positions are positioned adjacent to an outer side of the at least one left-side wheel and an outer side of the at least one right-side wheel, respectively, the outer sides facing away from one another; and wherein, when the item carrier is arranged in the second configuration, the at least one left-side wheel and the at least one right-side wheel are positioned within respective indentations formed in an inner side of the left-side ski and an inner side of the right-side ski, the inner sides facing one another.

* * * * *